US008498005B2

(12) United States Patent
Yamada

(10) Patent No.: US 8,498,005 B2
(45) Date of Patent: Jul. 30, 2013

(54) INITIATING A CONVERSION FUNCTION OF AN INFORMATION PROCESSING DEVICE THROUGH OPERATION OF AN IMAGE FORMING DEVICE

(75) Inventor: Kazutaka Yamada, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1188 days.

(21) Appl. No.: 12/341,521

(22) Filed: Dec. 22, 2008

(65) Prior Publication Data
US 2009/0168099 A1 Jul. 2, 2009

(30) Foreign Application Priority Data

Dec. 27, 2007 (JP) .................. 2007-337973

(51) Int. Cl.
*G06F 3/12* (2006.01)
(52) U.S. Cl.
USPC ........................................ 358/1.15
(58) Field of Classification Search
USPC ........................................ 358/1.15
See application file for complete search history.

(56) References Cited

U.S. PATENT DOCUMENTS

| 6,369,907 | B1* | 4/2002 | Aoki ........................... 358/1.15 |
| 6,493,028 | B1* | 12/2002 | Anderson et al. .......... 348/222.1 |
| 7,057,751 | B1 | 6/2006 | Shiraiwa |
| 2002/0060809 | A1 | 5/2002 | Aoki |
| 2004/0160630 | A1* | 8/2004 | Iriyama et al. ............... 358/1.15 |
| 2006/0082802 | A1 | 4/2006 | Furuya |
| 2006/0132616 | A1* | 6/2006 | Tanaka et al. ............... 348/211.3 |
| 2007/0013562 | A1 | 1/2007 | Nagasawa |
| 2007/0035763 | A1* | 2/2007 | Bard et al. .................... 358/1.15 |

FOREIGN PATENT DOCUMENTS

| JP | 10-187385 | 7/1998 |
| JP | 11007701 | 1/1999 |
| JP | 11-175294 | 7/1999 |
| JP | 2000015899 | 1/2000 |
| JP | 2001014152 | 1/2001 |
| JP | 2005-161592 | 6/2005 |
| JP | 2006-110861 | 4/2006 |
| JP | 2006-246408 | 9/2006 |
| JP | 2007028179 | 2/2007 |
| JP | 2007-088663 | 4/2007 |
| JP | 2007-304881 | 11/2007 |

OTHER PUBLICATIONS

Office Action received for counterpart Japanese Application No. 2007-337973 mailed Jul. 1, 2010.
Notification of Reasons of Rejection Japanese Application No. 2007-337973 mailed on Oct. 29, 2009.

* cited by examiner

*Primary Examiner* — Eric A Rust
(74) *Attorney, Agent, or Firm* — Banner & Witcoff, Ltd.

(57) ABSTRACT

There is provided an image forming system, comprising an image forming device and an information processing device communicatably connected to the image forming device. The image forming device comprises an information obtaining unit to obtain at least one of target data and information specifying the target data from one of internal and external memories; a transmission unit to transmit the obtained information to the information processing device; and a image formation unit to execute an image formation process for data generated by converting the target data into data having a data format which the image forming device is able to handle. The information processing device comprises a conversion unit configured to convert the target data into the data having the data format based on the obtained information; and a second transmission unit configured to transmit the converted data to the image forming device.

15 Claims, 8 Drawing Sheets

Please designate an application for print.

Internet Explorer
Image Viewer
Paint

FIG. 3

Please set print conditions.

Paper Size: A4
Paper Type: Plain
Print Quality: Fine
Multiple-Page Print: 2 page
Color Mode: Natural

FIG. 5

Direct Print can not be executed for print target data. Do you execute print via PC?

1: Yes
2: Stop Printing

FIG. 6

Do you transmit print target data to PC?

1: Transmit

2: Transmit Path Information of Data

FIG. 8

INITIATING A CONVERSION FUNCTION OF AN INFORMATION PROCESSING DEVICE THROUGH OPERATION OF AN IMAGE FORMING DEVICE

CROSS-REFERENCE TO RELATED APPLICATION

This application claims priority under 35 U.S.C. §119 from Japanese Patent Application No. 2007-337973, filed on Dec. 27, 2007. The entire subject matter of the application is incorporated herein by reference.

BACKGROUND

1. Technical Field

Aspects of the present invention relate to an image forming system and an image forming device for executing an image formation process.

2. Related Art

Image forming devices capable of executing a so-called direct print function in which data obtained form an external memory device (e.g., a USB memory) is directly obtained and the obtained data is subjected to a print process have been widely used. An example of such a image forming device is disclosed in Japanese Patent Provisional Publication No. HEI 11-7701A (hereafter, referred to as JP HEI 11-7701A).

SUMMARY

However, when the direct print function is executed in the above described image forming device, a print process is executed through software installed on the image forming device. That is, the print process is executed without using a printer driver installed on a personal computer. On the other hand, an external memory device may store various types of data. Therefore, there is a possibility that the external memory data stores data having a data format not supported by the image forming device.

If data having a data format not supported by the image forming device is stored in the external memory device, the image forming device is not able to execute the direct print function for such data. In such a case, eventually a user needs to attach the external memory device to a personal computer again, and to operate the personal computer to process the data (i.e., to execute a so-called "PC print").

In general, the capacity of an internal memory of an image forming device is smaller than that of a personal computer. Therefore, if a relatively large amount of data is subjected to the direct print on the image forming device, the processing time for executing the large amount of data on the image forming device may become larger than the processing time for executing the same data by "PC print" on the personal computer.

In general, the PC print and the direct print have different types of print conditions. Therefore, if print target data requires a print condition which is settable only on the personal computer, the user needs to execute the PC print on the personal computer.

Aspects of the present invention are advantageous in that at least one of an image forming system and an image forming device capable of enhancing usability of executing an image formation process for data stored in an internal or external memory is provided.

According to an aspect of the invention, there is provided an image forming system, comprising: an image forming device which executes an image formation process; and an information processing device communicatably connected to the image forming device. In this configuration, the image forming device comprises: an information obtaining unit configured to obtain at least one of target data and information specifying the target data from one of an internal memory and an external memory; a first transmission unit configured to transmit the information obtained by the information obtaining unit to the information processing device; and a image formation unit configured to execute the image formation process for data generated by converting the target data into data having a data format which the image forming device is able to handle. The information processing device comprises: a conversion unit configured to convert the target data into the data having the data format which the image forming device is able to handle based on the information obtained by the information obtaining unit; and a second transmission unit configured to transmit the data converted by the conversion unit to the image forming device.

Such a configuration makes it possible to execute the image formation process through a conversion function of the information processing device by only operating the image forming device. Consequently, usability of executing the image formation process on the image forming device can be enhanced.

According to another aspect of the invention, there is provided an image forming device communicatably connected to an information processing device. The image forming device comprises: an information obtaining unit configured to obtain at least one of target data and information specifying the target data from one of an internal memory and an external memory; a first transmission unit configured to transmit the information obtained by the information obtaining unit to the information processing device; a receiving unit configured to receive converted data which is generated on the information processing device by converting the target data into the converted data having a data format which the image forming device is able to handle; and a image formation unit configured to execute the image formation process for the converted data.

Such a configuration makes it possible to execute the image formation process through a conversion function of the information processing device by only operating the image forming device. Consequently, usability of executing the image formation process on the image forming device can be enhanced.

According to another aspect of the invention, there is provided a method to be implemented on an image forming device communicatably connected to an information processing device. The method comprises the steps of: obtaining at least one of target data and information specifying the target data from one of an internal memory and an external memory; transmitting the obtained information to the information processing device; receiving converted data which is generated on the information processing device by converting the target data into the converted data having a data format which the image forming device is able to handle; and executing an image formation process for the converted data.

Such a configuration makes it possible to execute the image formation process through a conversion function of the information processing device by only operating the image forming device. Consequently, usability of executing the image formation process on the image forming device can be enhanced.

According to another aspect of the invention, there is provided a computer readable medium having computer readable instruction stored thereon, which, when executed by a processor of an image forming device communicatably connected to an information processing device, configures the processor to perform the steps of: obtaining at least one of target data and information specifying the target data from one of an internal memory and an external memory; transmitting the obtained information to the information processing device; receiving converted data which is generated on the information processing device by converting the target data into the converted data having a data format which the image forming device is able to handle; and executing an image formation process for the converted data.

Such a configuration makes it possible to execute the image formation process through a conversion function of the information processing device by only operating the image forming device. Consequently, usability of executing the image formation process on the image forming device can be enhanced.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 illustrates a dialog for designating an application.

FIG. 5 illustrates a print setting screen displayed on the printer.

FIG. 6 illustrates a dialog requesting a user to decide whether to execute print via PC.

FIG. 8 illustrates a confirmation screen for inquiring of a user whether to transmit print target data to a computer.

DETAILED DESCRIPTION

Hereafter, an embodiment according to the invention will be described with reference to the accompanying drawings.

Figure 1:
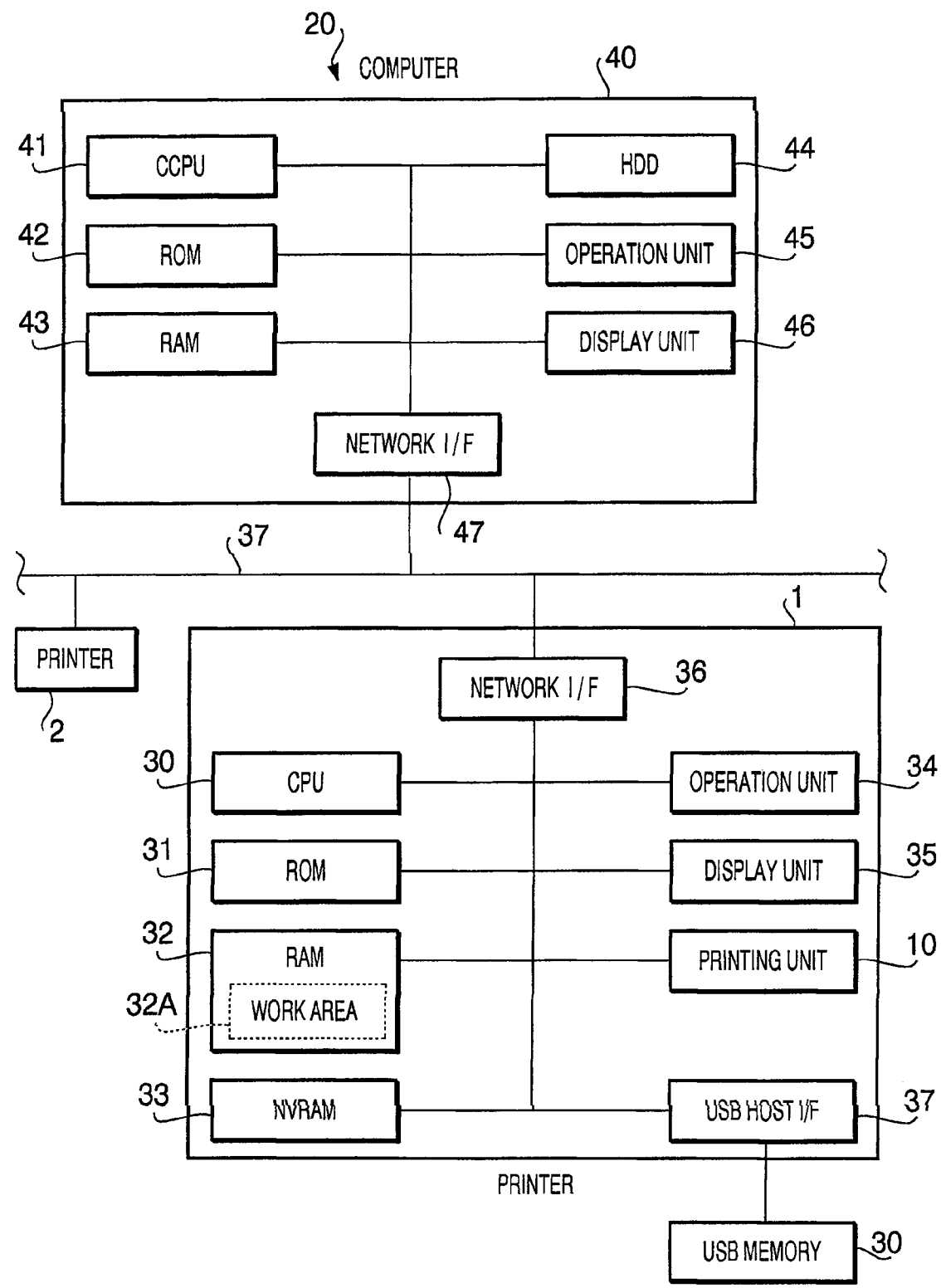
FIG. 1 illustrates a system configuration of a print system according to an embodiment.

FIG. 1 illustrates a system configuration of a print system (image formation system) 20 according to an embodiment. The print system 20 includes a printer (image forming device) 1, a computer 40 and another printer 2. The printers 1 and 2 and the computer 40 are connected to each other via a network 37. The print system 20 may include more than one computer 40.

The printer 1 includes a CPU 30, a ROM 31, a RAM 32, an NVRAM (a non-volatile memory) 33, an operation unit 34, a display unit 35, a print unit 10, a network interface 36, and a USB host interface 37.

The ROM 31 stores various programs for controlling functions of the printer 1, such as a print process. By loading and executing programs in the ROM 33, the CPU 30 controls the functions of the printer 1 while using the RAM 32 and the NVRAM 33 as work memories.

The operation unit 34 has a plurality of buttons. Through the operation unit 34, a user is able to conduct various types of user operations, such as input of a print command. The display unit 35 includes an LCD and a lamp. On the display unit 35, various types of information, such as a setting screen and operation conditions, are displayed.

The network interface 36 interfaces the printer 2 with the network 37. Therefore, the printer 1 is able to communicate with the computer 40 and the printer 2 via the network interface 36.

A USB memory 38 can be detachably connectable to the printer 1. In the state where the USB memory 38 is connected to the printer 1, information in the USB memory 38 can be transferred into the printer 1 via the USB host interface 37. The USB memory 38 is able to store a plurality of image data having various types of data formats (e.g., an image format or a text format). Since the printer 2 has the same configuration as that of the printer 1, explanations thereof will not be repeated.

The computer 40 includes a CPU 41, a ROM 42, a RAM 43, a HDD (hard disk drive) 44, an operation unit 45, a display unit 46, and a network interface 47. The HDD 44 stores various programs, such as an application program for creating data for printing and a printer driver. The operation unit 45 includes a pointing device and a keyboard. The display unit 46 includes an LCD. The network interface 47 interfaces the computer 40 with the network 37.

Hereafter, a print process for image data stored in the USB memory 38 is described.

First, processes executed on the printer 1 are explained. When the USB memory 38 is attached to the printer 1, the CPU 30 of the printer 1 executes a memory data print process shown in FIG. 2. First, in step S101, the CPU 30 selects a piece of image data to be targeted for printing (hereafter, frequently referred to as print target data) from among a plurality of pieces of image data stored in the USB memory 38 (step S101). The CPU 30 may sequentially determine print target data in predetermined order (e.g., chronological order of data, or order in which data is registered) or the CPU 30 may determine the print target data in accordance with designation from the user.

If the CPU 30 determines the print target data in accordance with the user designation, the CPU 30 obtains specifying information (e.g., a pathname and a data name) of the plurality of pieces of image data stored in the USB memory 38 from the USB memory 38, and displays filenames of files respectively containing the plurality of pieces of image data on the display unit 35 of the printer 1. In this case, the user is able to designate the print target data from among the plurality of pieces of image data displayed as a list on the display unit 35. If the user designates the print target data through the operation unit 34, the CPU 30 obtains information (body data of the print target data, and the specifying information concerning the print target data) from the USB memory 38.

Next, the CPU 30 obtains information concerning a printer driver (hereafter, referred to as printer driver information) from the computer 40 (step S103), and obtains information concerning applications (hereafter, referred to as application information) from the computer 40 (step S105). The printer driver information includes print conditions which are settable on the printer driver installed on the computer 40. More specifically, the print conditions include a paper size, a paper type, a printing quality, a print layout (e.g., a multiple-page layout (two-in-one, three-in-one, etc.)) and monochrome or color print setting). The application information is information concerning the applications installed on the computer 40. In this case, the CPU 30 may display a dialog shown in FIG. 3 to request the user to designate an application used for data conversion of the print target data in a converted data transmission process of the computer 40. The converted data transmission process is explained later. The information concerning the designated application is included in a user-set print condition which is explained later. In the dialog shown in FIG. 3, Internet Explorer, Image Viewer and Paint are displayed as options.

Figure 4:
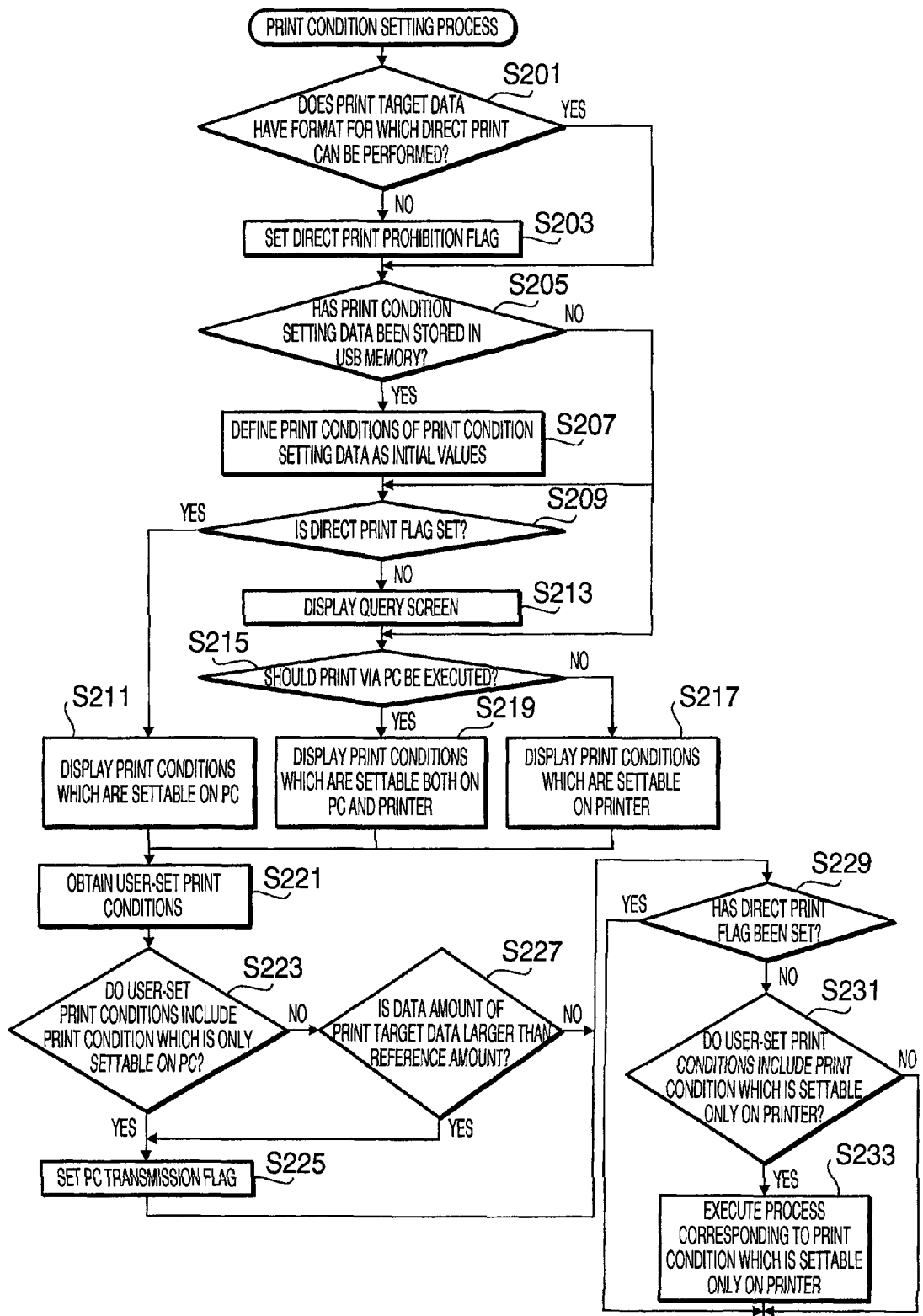
FIG. 4 is a flowchart illustrating a print condition setting process executed by the printer.

After step S105 is processed, a print condition setting process is executed (step S107). FIG. 4 is a flowchart illustrating the print condition setting process executed under control of the CPU 30 of the printer 1.

First, in step S201, the CPU 30 judges whether the print target data has a format for which "direct print" can be performed. The term "direct print" means a print mode where the printer 1 directly obtains the print target data from the USB memory 38 and prints an image corresponding to the obtained print target data. Therefore, the operation mode of the direct print is different from "print via PC". As described in detail later, the term "print via PC" means a print mode where the printer 1 transmits the information concerning the print target data to the computer 40 to print an image corresponding to the print target data via the computer 40.

In this embodiment, the printer 1 is able to execute the direct print only for data having an image format (e.g., a JPEG format or a TIFF format). Therefore, the printer 1 is not able to execute the direct print for data having a text format and data having an application-specific format (e.g., a word file format or an excel file format of Microsoft cooperation). If the print target data does not have a format for which the direct print can be performed (S201: NO), the CPU 30 sets a direct print prohibition flag, for example, in the RAM 32. If the print target data has a format for which the direct print can be performed (S201: YES), the CPU 30 does not set the direct print prohibition flag.

In step S205, the CPU 30 judges whether print condition setting data corresponding to the print target data is stored in the USB memory 38. The term "print condition setting data" means data which relates to print conditions of each of the plurality of pieces of image data and has been stored in advance in the USB memory 38 in association with each of the plurality of pieces of image data.

If the print condition setting data has been stored in the USB memory 38 (S205: YES), the CPU 30 reads the print condition setting data from the USB memory 38 and stores temporarily the obtained print settings in the RAM 23 as initial values for print setting screens provided in steps S211, S217, and S219 which are described later (step S207). If the print condition setting data has not been stored in the USB memory 38 (S205: NO), control proceeds to step S209 without processing step S207.

Next, in step S209, the CPU 30 judges whether the direct print prohibition flag has been set. If the direct print prohibition flag has been set (S209: YES), based on the printer driver information the CPU 30 creates a print setting screen through which the user is able to set the print conditions which are settable on the printer driver, and displays the print setting screen on the display unit 35 (step S211). FIG. 5 is an example of the print setting screen displayed in step S211. As shown in FIG. 5, the settings which are settable on the printer drive include settings of the paper size, the paper type, the print quality, the multiple-page print, and the color mode (which are referred to as PC print condition hereinafter).

When execution of the direct print is impossible as described above, the CPU 30 may present a dialog shown in FIG. 6 so as to request the user to decide whether the user wants to execute the print via PC or the user wants to stop the print process. Such a dialog shown in FIG. 6 is useful because the user is able to stop the print process if communication between the printer 1 and the computer 40 is in an abnormal state.

If the direct print prohibition flag has not been set (S209: NO), the CPU 30 displays, on the display unit 35, a query screen for inquiring about whether to execute the print via PC (step S213). The reason why such a query screen for inquiring about whether to execute the print via PC even in the state where the direct print is possible is provided is as follows.

First, the PC print condition includes setting which can be treated only by the printer driver of the computer 40 (e.g., the level setting of the print quality and setting of the multiple-page layout). It should be noted that since in general a computer has the larger internal memory size than that of a printer, the computer is able to support finer settings, such as a print quality and the print layout, in comparison with a printer. On the other hand, a printer supports specific print conditions for direct print, such as frame print.

That is, the PC print conditions may have setting items different from the print conditions which are settable on the printer 1. Hereafter, the conditions settable on the printer 1 are frequently referred to as "PR print conditions". Therefore, it is preferable that the print via PC is allowed even in the state where the direct print is possible.

If the user does not select the print via PC (S215: NO), control proceeds to step S217 where the CPU 30 displays, on the display unit 35, a print setting screen though which the user is able to set the PR print conditions. The PR print conditions include the frame print. More specifically, for execution of the frame print, frame data stored in advance in the NVRAM 33 is used to add a particular frame (e.g., a frame having various types of pictures designed for surrounding a photograph image) to a print target image.

On the other hand, if the user designates the print via PC (S215: YES), the CPU 30 displays, on the display unit 35, a print setting screen containing both of the PC print conditions and the PR print conditions (step S219). By this configuration, the user is able to set the multiple-page print as well as the frame print. It should be noted that if the current print target data has the associated print condition setting data, print conditions in the print condition setting data are displayed in the print setting screen as initial values. Such a configuration enables the user to simplify the setting operation if the settings of the print condition setting data (i.e., the initial values) can be used without change.

Next, in step S221, the CPU 30 obtains the print conditions (hereafter, referred to as user-set print conditions) finally set by the user on the above described print setting screen. Then, in step S223, the CPU 30 judges whether the user-set print conditions include a print condition which is only settable on the computer 40 (e.g., the multiple-page print). If the user-set print conditions include a print condition which is only settable on the computer 40 (S223: YES), control proceeds to step S225 where the CPU 30 sets a PC transmission flag stored, for example, in the RAM 32. Then, control proceeds to step S229.

If the user-set print conditions do not include a print condition which is only settable on the computer 40 (S223: NO), control proceeds to step S227 where the CPU 30 judges whether the data amount of the current print target data is larger than a reference amount. In this embodiment, the RAM 32 is provided with a work area 32A used as a work for the print target data. More specifically, the work area 32A is used to execute a developing process for developing the print target data as raster data. Therefore, the reference amount is set to an amount larger by a certain amount than a data amount which allows the CPU 30 to execute the developing process collectively.

If the data amount of the print target data is larger than the reference amount (S27: YES), the CPU 30 sets the PC transmission flag (step S225). Then, control proceeds to step S229.

In step S229, the CPU 30 judges whether the direct print prohibition flag is set. If the direct print prohibition flag is set (i.e., if the format of the current print target data is not supported by the direct print) (S229: YES), the print condition setting process terminates. In this case, control proceeds to step S109 in FIG. 2. If the direct print prohibition flag is not set (i.e., if the format of the current print target data is supported by the direct print (S229: NO), control proceeds to step S231 where the CPU 30 judges whether the user-set print conditions include a print condition which is settable only on the printer 1.

If the user-set print conditions include a print condition which is settable only on the printer 1 (e.g., the frame print) (S231: YES), control proceeds to step S233 where the CPU 30 executes a process concerning the print condition which is settable only on the printer 1. For example, regarding the frame print, the CPU 30 obtains frame data stored in the NVRAM 33 in step S233. Then, the print condition setting process terminates, and control proceeds to step S109 in FIG. 2.

Figure 2:
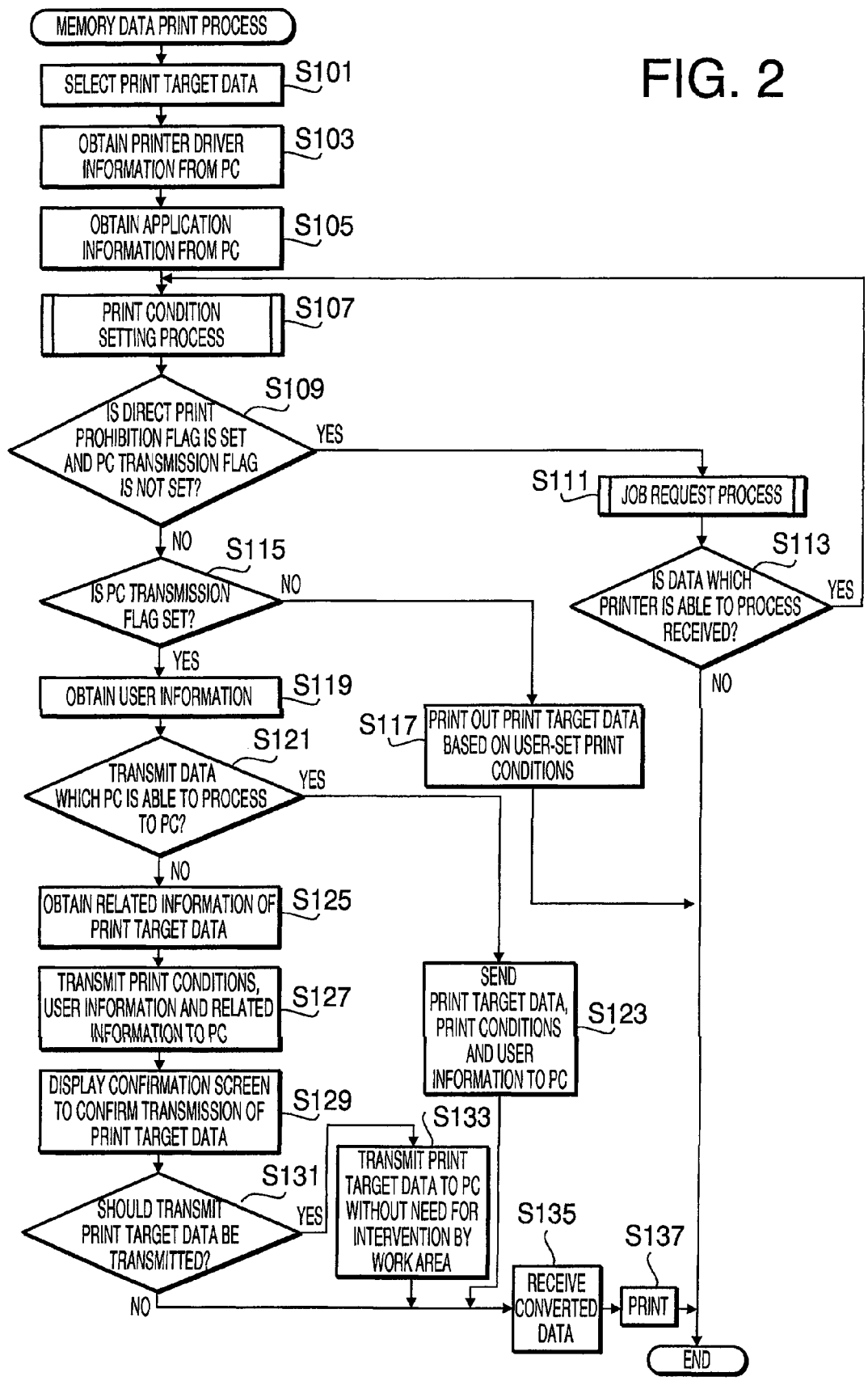
FIG. 2 is a flowchart illustrating a memory data transmission process executed on a printer.

In step S109 of FIG. 2, the CPU 30 judges whether the printer 1 is in the state where the direct flag is set and the PC transmission flag is not set. Such a sate is caused if the print condition setting data corresponding to the print target data has a print condition (e.g., sepia photograph print) not included in the PC print conditions and the PR print conditions or if the current print target data has a format not supported by the computer 40 and the printer 1. If the printer 1 is in the state where the direct flag is ser and the PC transmission flag is not set (S109: YES), control proceeds to step S111 where the CPU 30 executes a job request process.

Figure 7:
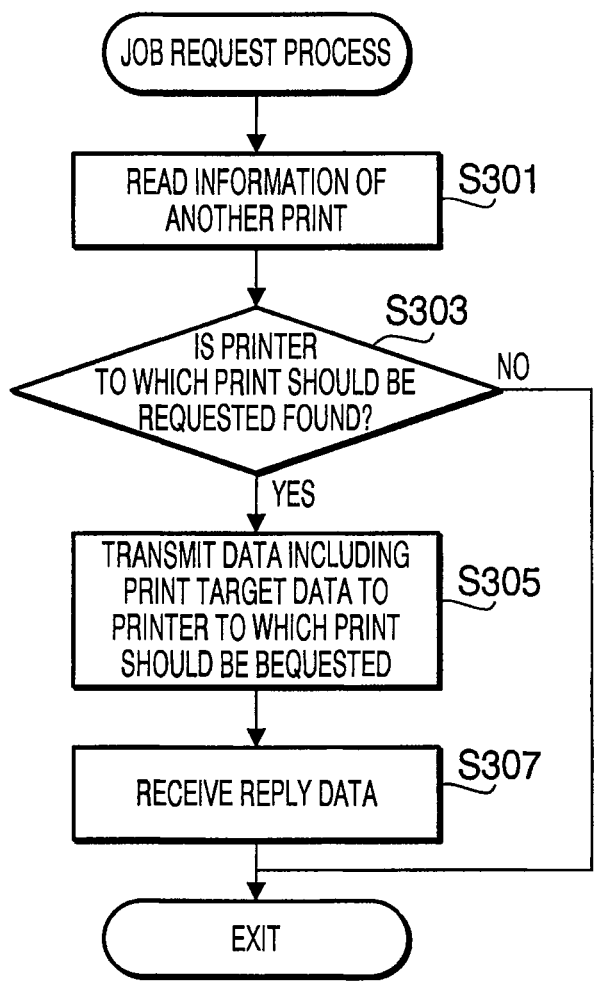
FIG. 7 is a flowchart illustrating a job request process executed by the printer.

Hereafter, the job request process executed in step S111 is described with reference to FIG. 7. In the NVRAM 33 of the printer 1, information concerning other printers with which the printer 1 is able to communicate is stored. For example, in the printer 1 an identification number, settable print conditions, and supported data formats are stored for each of other printers with which the printer 1 is able to communicate.

In step S301, the CPU 30 reads the above described information concerning other printers. Then, the CPU 30 consults the information concerning other printers to judge whether a printer to which processing of the print target data can be requested is found. More specifically, the printer to which processing of the print target data can be requested means a printer which supports the sepia color print or a printer (e.g., a printer supporting a post script format) which is able to process a data format not supported by the computer 40 and the printer 1.

If the printer to which processing of the print target data is requested is the printer 2 (S303: YES), the CPU 30 transmits a command containing the print target data and instructions representing how to process the print target data (step S305). After receiving the command from the printer 1, the printer 2 processes the print target data, for example, to generate a sepia photograph corresponding to the print target data, and then sends the processed data back to the printer 1. Alternatively, the printer 1 coverts the data format of the received print data (e.g., postscript data) to a particular format (e.g., JPEG format data) which the printer is able to handle, and then sends the converted data back to the printer 1. The CPU 30 of the printer 1 receives the reply from the printer 1 (step S307). Then, the job request process terminates, and control proceeds to step S113 in FIG. 3.

In step S133, the CPU 30 judges whether the replay data from another printer (i.e., print target data which the printer 1 is able to handle) has been received. If the replay data has been received (S133: YES), control returns to step S107. If the reply data has not been received (S133: NO), the CPU 30 judges that the printer 1 is not able to handle the print target data and terminates the memory data print process show in FIG. 2. At this time, the CPU 30 may display specifying information of the print target data and a message indicating that the printing process can not be executed on the display unit 33.

If the direct print flag is not set or if the direct flag is not set and the PC transmission flag is ser (S109: NO), control proceeds to step S115. For example, if the user-set print conditions do not include conditions not belonging to the PC print conditions and the PR print conditions or if the current print target data has a data format which the printer 40 or the printer 1 is able to handle, control proceeds from step S109 to S115.

In step S115, the CPU 30 judges whether the PC transmission flag is ser. If the PC transmission flag is not set (S115: NO), control proceeds to step S117. In step S117, the CPU 30 executes the developing process to develop the current print target data in the work area 32A in accordance with the user-set print conditions, and then controls the print unit 10 to execute the print process for the developed data. That is, in this case the CPU 30 executes the direct print.

If the PC transmission flag is set (S115: YES), control proceeds to step S119 to execute steps for the print via PC. That is, in step S119, the CPU 30 reads the user information, for example, from the NVRAM 33. The user information (e.g., user ID) represents the user who is now operating the printer 1. The user information can be obtained by conducting a user operation through the operation unit 34. If the user information has been stored in advance in the USB memory 38, the printer 1 is able to obtain the user information from the USB memory 38.

Next, the CPU 30 judges whether to transmit the print target data to the computer 40 after processing the print target data on the printer 1 or to transmit the print target data without processing the print target data on the printer 1 (step S121). For example, if the user-set print conditions include the frame print, the CPU 30 judges that the print target data should be transmitted to the computer 40. In this case (S121: YES), control proceeds to step S123 where the CPU 30 transmits the print target data for which a process for adding a frame image to a print target image has been executed based on the frame data, the user-set print conditions and the user information to the computer 40. Then, control proceeds to step S135.

If the CPU 30 judges that the print target data should not be transmitted to the computer 40 (S121: NO), the CPU 30 obtains information (e.g., e.g., path information, an attribute, the number of pages, a filename of a file containing the print target data, a creation date and time, a creator, and a data size) concerning the print target data from the print target data (step S125). The path information is described by a character string representing the location of corresponding data (which is described later). For example, the path information is expressed as "\\PC1\Share\My Pictures\abc.doc". Hereafter, the path information is frequently referred to as "related information". Then, the CPU 30 transmits the related information, the user-set print conditions and the user information to the computer 40 (step S127).

Next, the CPU 30 transmits a confirmation screen shown in FIG. 8 on the display unit 35 so as to inquire of the user whether to transmit the print target data to the computer 40 (step S129). If the user selected not to transmit the print target data (S131: NO), control proceeds to step S135 without transmitting the print target data itself to the computer 40. In this case, the user has selected an item "transmit path information of data" through the confirmation screen shown in FIG. 8. However, the path information has been transmitted together with other related information to the computer 40. On the other hand, if the user selected to transmit the print target data (S131: YES), the CPU 30 transmits the print target data to the computer 40, and thereafter control proceeds to step S135.

In step S135, the CPU 30 may temporarily move the current print target data to the work area 32A, and thereafter move the print target data to a transmission buffer of the network interface 36 to transmit the print target data to the computer 40.

In this embodiment, in step S135, the CPU 30 moves the print target data to the transmission buffer of the network interface 36 without moving temporarily the print target data to the transmission buffer of the network interface 36. Such a configuration not to move the print target data temporarily to the transmission buffer of the network interface 36 makes it possible to decrease the time required for the transmission process, and to utilize the work area 32A for another process.

Next, in step S135, the CPU 30 receives converted data (which is explained later) from the computer 40. Then, the CPU 30 controls the print unit 10 to execute the print process based on the converted data (step S137). Then, the memory data print process terminates.

Figure 9:
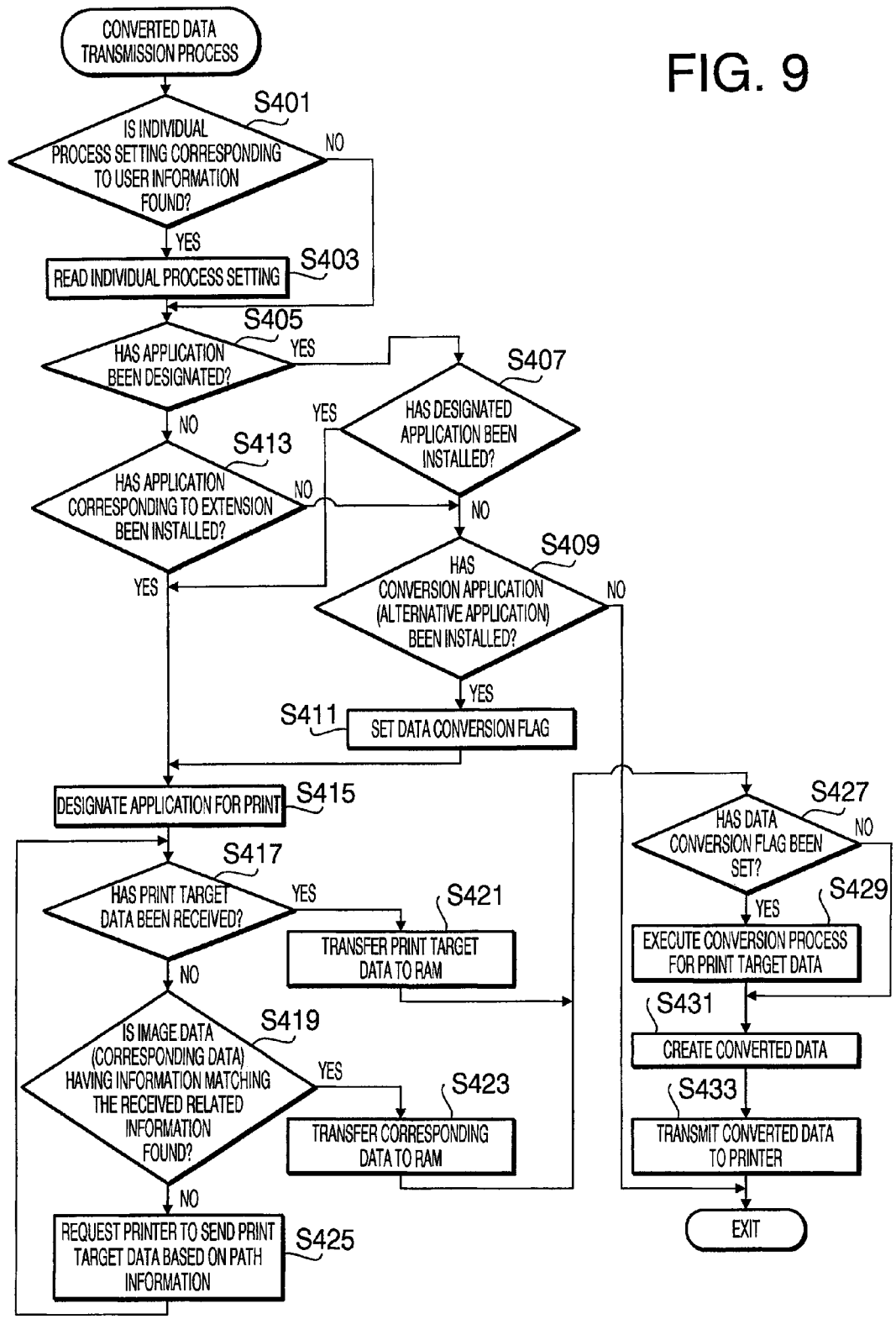
FIG. 9 is a flowchart illustrating a converted data transmission process executed on the computer.

Hereafter, processing on the side of the computer 40 is explained. When the above described related information, the user-set print conditions and the user information are transmitted to the computer 40. The CPU 41 of the computer 40 executes a converted data transmission process shown in FIG. 9. First, the CPU 41 judges whether individual process setting corresponding to the received user information has been stored, for example, in the HDD 44. The term individual process means a print process of which setting is set individually for each user. The individual process is, for example, a process for overlaying a date and time or a user ID on a print target image, a watermark print process (e.g., a process for overlaying a "CONFIDENTIAL" on a print target image as a watermark), and a designation of an application executing a print process defined for each data type.

If the individual process setting has been stored (S401: YES), the CPU 41 reads information concerning the individual process setting from the HDD 44 (step S403). Then, control proceeds to step S405. If the individual process setting has not been stored (S401: NO), control proceeds to step S405. In step S405, the CPU 41 judges whether a particular application has been designated based on application designation information contained in the user-set print conditions.

If a particular application has been designated (S405: YES), control proceeds to step S407 where the CPU 41 judges whether the designated application has been installed on the computer 40 (step S407). In this embodiment, applications which have already been installed on the computer 40 are presented and the user designated one of the presented applications. Therefore, the application designated in the application designation information has been obviously installed on the computer 40. In this case (S407: YES), control proceeds to step S415.

It should be noted that in step S105 the printer 1 may allow the user to designate an application not installed on the computer. In this case, the CPU 41 may judge that a designated application has not been installed on the computer 40 (S407: NO).

If the CPU 41 judges that no particular application has been designated (S405: NO), control proceeds to step S413 where the CPU 41 judges whether an application corresponding to an extension of a filename of a file containing the current print target data has been installed on the computer 40. For example, if an extension of a file of the print target data is "doc", the CPU 41 judges whether Microsoft® Word has been installed on the computer 40. On the other hand, if an extension of a file of the print target data is "xls", the CPU 41 judges whether Microsoft® Excel has been installed on the computer 40. If an application corresponding to the extension has been installed on the computer 40 (S413: YES), control proceeds to step S415. If an application corresponding to the extension has not been installed on the computer 40 (S413: NO), control proceeds to step S409.

In step S409, the CPU 41 judges whether an application (hereafter, frequently referred to as a conversion application) which is not any of an application designated by the application designation information and an application corresponding to the extension but is able to convert the print target data into the data format supported by the printer 1. For example, if an application corresponding to a Word format or an Excel format has been designated but the application has not been installed on the computer 40, the computer 40 may convert the print target data into data having a data format which the computer 40 is able to handle through use of the conversion application. In this case, the computer 40 is able to execute a required process for the converted data. More specifically, if the conversion application converts the data having a Word format into text data, the computer 40 is able to provide the data supported by the printer 1 by converting the Word format data into text data through the conversion application and thereafter converting the text data into the data (e.g., dot pattern data), for example, through a "Note Pad". That is, the computer 40 is able to convert the print target data in a Word format into the dot pattern data even if "Word" is not installed on the computer 40.

If the conversion application has not been installed on the computer 40 (S409: NO), the converted data transmission process terminates. Similarly, if the conversion application is not able to convert the print target data into another format, the converted data transmission process terminates. In this case, the CPU 41 may transmit information representing occurrence of a print error to the printer 1 so that an error message can be displayed on the display unit 35.

If the conversion application has been installed on the computer 40 (S209: YES), control proceeds to step S411 where the CPU 41 sets a data conversion flag stored, for example, in the RAM 43. Then, control proceeds to step S415.

In step S415, the CPU 41 designates an application (e.g., an application designated in the application designation information or the conversion application) to be used for the print process. Then, the CPU 41 judges whether the print target data itself has been received from the printer 1 (step S417). If the print target data has been received from the printer 1 (S417: YES), the CPU 41 transfers the print target data, for example, to the RAM 43 for the subsequent conversion process (step S421). Then, control proceeds to step S427.

If the print target data has not been received from the printer 1 (S417: NO), control proceeds to step S419 where the CPU41 searches a storage device (e.g., the HDD 40 in the computer 40) for image data (hereafter, frequently referred to as "corresponding data") having information matching the received related information. If the corresponding data is found (S419: YES), the CPU 41 obtains the corresponding data and transfers the corresponding data, for example, to the RAM for the subsequent conversion process (step S423). Then, control proceeds to step S427. Such a configuration enables the computer 40 to execute the conversion process for the print target data without transmitting the print target data from the printer 1 to the computer 40.

If the corresponding data is not found (S419: NO), control proceeds to step S425 where the CPU 41 returns the path information contained in the received related information to the printer 1 to request the printer 1 to transmit the print target data corresponding to the path information. Then, the CPU 41 receives the print target data from the printer 1, and transfers the print target data, for example, to the RAM 43 for the subsequent conversion process (step S421). Then, control proceeds to step S427.

In step S427, the CPU 41 judges whether the data conversion flag is set (step S427). If the data conversion flag is set (S427: YES), the CPU 41 executes the conversion process for the print target data (or the corresponding data) through the conversion application (step S429). Then, control proceeds to step S431. On the other hand, if the data conversion flag is not ser (S429: NO), control proceeds directly to step S431.

In step S431, the CPU 41 creates the converted data by converting the print target data (or the corresponding data) into data (i.e., the converted data) having the data format supported by the printer 1 through the application (or a printer driver) in accordance with the user-set print conditions and the individual process setting. For example, the converted data has a form of dot pattern data. The CPU 41 executes such a conversion process on the RAM 43. Then, the CPU 41 transmits the converted data to the printer 1 (step S433).

As described above, according to the embodiment, when the printer 1 receives information (at least one of the print target data and the specifying information) from the USB memory 38, the printer transmits the information to the computer 40. The computer 40 which has received the information converts the print target data into the data having the data format supported by the printer 1, and transmits the converted data to the printer 1. Next, the printer 1 executes the print process for the converted data which has been converted on the computer 40.

The printer 1 judges whether the print target data can be subjected to the direct print (S201). Even if the print target data can not be subjected to the direct print, the printer 1 is able to execute the print process for the print target data through the print via PC. That is, even if the print target data can not be subjected to the direct print, the printer 1 is able to execute the print process without requiring a user operation on the computer 40.

Further, the printer 1 judges whether the user-set print conditions include a print condition (e.g., the frame print) which can be handled only on the computer (step S223). If such a print condition (e.g., the frame print) is contained in the use-set print conditions, the printer 1 is able to execute the print process through the print via PC without requesting a user operation on the computer 40.

It should be noted that if the direct print is executed for print target data having a data amount larger than a data amount in which the printer 1 is able to execute a process for the print target data correctively on the work area A, load of developing the print target data on the printer 1 considerably increases and thereby the entire processing time increases considerably. In such a case, the CPU 41 needs to repeat dividing the print target data into a plurality of data blocks, transferring each block to the work area 32A to execute the developing process for each block, moving the developed data to the transmission buffer, and then moving the next block to the work area 32A.

For this reason, in this embodiment, the printer 1 judges whether a data amount of the print target data is larger than a data amount in which the printer 1 is able to execute the print process collectively. If a data amount of the print target data is larger than a data amount in which the printer 1 is able to execute the print process collectively, the printer 1 request the computer 40 to execute the developing process in the print via PC, and receives the developed data from the computer 40. Since the computer 40 is able to secure a work memory larger than that of the printer 1, it is possible to decrease the processing time for the print target data in comparison with the direct print.

The printer 1 allows the user to set, on the printer 1, the PC print conditions which are settable only on the computer 40, and to execute the "print via PC" in accordance with the PC print conditions. Therefore, the printer 1 is able to execute the print process for image data stored in the USB memory 38 in accordance with print conditions which are not supported by the printer 1 but are supported by the computer 40. In addition, since the PC print conditions are obtained from the computer 40 based on the printer driver information, the printer 1 is able to reliably judge whether the print target data can be converted on the computer 40

Although the present invention has been described in considerable detail with reference to certain preferred embodiments thereof, other embodiments are possible.

In the above described embodiment, the USB memory 38 is taken as an example of a memory device containing data to be subjected to the print process. However, various types of external memories such as a removal medium or an external HDD of a digital camera can be used as a memory device containing data to be subjected to the print process of the printer 1. An internal memory (e.g., the NVRAM 33) of the printer 1 may be used as a memory device containing data to be subjected to the print process.

In the above described embodiment, the HDD 44 is taken as an example of a memory device for which image data corresponding to the related information is searched. However, another internal memory of the computer 40 may be used as a memory device for which image data corresponding to the related information is searched. Alternatively, an internal memory of an external computer (e.g., a server) connected to the computer 40 or an external storage device connected to the computer 40 may be used as a memory device for which image data corresponding to the related information is searched.

In the above described embodiment, the printer 1 obtains the PC print conditions based on the printer driver information from the computer 40. However, the printer 1 may be configured to allow the user to set various types of setting regardless of the PC print conditions, and transmit the inputted print conditions to the computer 40 so that the computer 40 is able to transmit an error signal to the printer 1 when conditions not supported by the computer 40 are included in the inputted settings.

In the above described embodiment, the CPU 41 of the computer 40 searches the HDD 44 for data having information matching the received related information. In this case, the CPU 41 may use only a filename as the related information. However, by using at least one of a data creation date and time, a creator and a data amount in addition to a filename, the CPU 41 is able to extract data having information matching the related information more reliably from the HDD 44 in comparison with the case where the data is searched for only by a filename.

In the above described embodiment, a print process is taken as an example of an image formation process; however, various types of image formation processes may be employed in the image formation system. For example, a process for displaying, on the display unit 35 of the printer 1, image data in the USB memory 38 may be adopted as an image formation process.

In the above described embodiment, a process for converting print target data into dot pattern data is adopted as a conversion process, however, various types of conversion processes may be adopted in the image formation system. For example, a process for converting print target data into PDL data may be adopted as a conversion process. If a conversion process for converting print target data into PDL data is adopted, the printer 1 processes the received PDL data to develop the PDL data as a dot pattern.

What is claimed is:

1. An image forming system, comprising:
an image forming device configured to execute an image formation process; and
an information processing device configured to be communicably connected to the image forming device,
the image forming device comprising:
an information obtaining unit configured to obtain at least one of target data and information specifying the target data from one of an internal memory and an external memory;
a first transmission unit configured to transmit the information obtained by the information obtaining unit to the information processing device; and
an image formation unit configured to execute the image formation process for data generated by converting the target data into data having a data format which the image forming device is able to handle,
the information processing device comprising:
a conversion unit configured to convert the target data into the data having the data format which the image forming device is able to handle based on the at least one of the target data and the information specifying the target data obtained by the information obtaining unit; and
a second transmission unit configured to transmit the data converted by the conversion unit to the image forming device,
wherein:
the image forming device is configured to judge whether execution of the image formation process by the image forming device for the target data is possible,
the image formation unit executes the image formation process for the target data in response to the image forming device judging that execution of the image formation process is possible,
the first transmission unit is configured to transmit the target data to the information processing device in response to the image forming device judging that execution of the image formation process is not possible, and
obtaining the at least one of the target data and the information specifying the target data is user-initiated at the image forming device.

2. The image forming system according to claim 1, wherein:
the image forming device is further configured to judge whether a data amount of the target data is larger than a reference amount;
the image formation unit is configured to execute the image formation process for the target data in response to the image forming device judging that the data amount of the target data is not larger than the reference amount; and
the first transmission unit is configured to transmit the target data to the information processing device in response to the image forming device judging that the data amount of the target data is larger than the reference amount.

3. The image forming system according to claim 1, wherein:
the image forming device is further configured to judge whether image formation conditions for the target data are supported by the image forming device;
the image formation unit is configured to execute the image formation process for the target data in response to the image forming device judging that the image formation conditions for the target data are supported by the image forming device;
the first transmission unit transmits is configured to transmit the target data and the image formation conditions to the information processing device in response to the image forming device judging that the image formation conditions for the target data are not supported by the image forming device; and
the conversion unit of the information processing device is configured to convert the target data into the data having the data format which the image forming device is able to handle based on the image formation conditions and the at least one of the target data and the information specifying the target data obtained by the information obtaining unit.

4. The image forming system according to claim 3, wherein:
the image formation conditions are stored in the internal memory or the external memory in association with each of a plurality of pieces of data in the internal memory or the external memory; and
the information obtaining unit is configured to obtain the image formation conditions together with the at least one of the target data and the information specifying the target data.

5. The image forming system according to claim 3, wherein the image forming device is further configured to obtain image formation conditions which the information processing device is able to handle from the information processing device.

6. The image forming system according to claim 1, wherein:
the image forming device is further configured to set image formation conditions which the information processing device is able to handle;
the first transmission unit is configured to transmit the image setting conditions corresponding to the at least one of the target data and information specifying the target data, together with the information obtained by the information obtaining unit; and
the conversion unit of the information processing device is configured to convert the target data into the data having the data format which the image forming device is able to handle based on the image formation conditions and the information obtained by the information obtaining unit.

7. The image forming system according to claim 1, wherein:
the image forming device further comprises a work memory used to execute the image formation process; and when the first transmission unit is configured to transmit the target data to the information processing device, wherein the target data is not stored in the work memory.

8. The image forming system according to claim 1, wherein:
the image forming device is further configured to designate the target data from one of the internal memory and the external memory; and
the first transmission unit is configured to transmit the designated target data.

9. The image forming system according to claim 1, wherein:
the information obtained by the information obtaining unit of the image forming device is the information specifying the target data; and
the information processing device is further configured to obtain the target data specified by the information specifying the target data from a storage unit which the information processing device is able to access.

10. The image forming system according to claim 9, wherein the information specifying the target data includes at least one of a data creation date and time, a creator, and a data amount.

11. The image forming system according to claim 1, wherein the conversion unit of the information processing device is configured to convert the target data through an application matching the target data.

12. The image forming system according to claim 11, wherein the conversion unit of the information processing device is configured to select the application to be used for converting the target data in accordance with an extension of a file storing the target data.

13. An image forming device communicably connectable to an information processing device, comprising:
a processor; and
memory storing computer readable instructions that, when executed, cause the image forming device to function as:
an information obtaining unit configured to obtain at least one of target data and information specifying the target data from one of an internal memory and an external memory, wherein obtaining the at least one of the target data and the information specifying the target data is user-initiated at the image forming device;
a judging unit configured to judge whether execution of an image formation process for the target data by the image forming device is possible;
a first transmission unit configured to:
transmit the at least one of the target data and the information specifying the target data to the information processing device in response to the judging unit judging that execution of the image formation process for the target data is not possible;
a receiving unit configured to receive converted data which is generated on the information processing device by converting the target data into the converted data having a data format which the image forming device is able to handle; and
a image formation unit configured to:
execute the image formation process for the target data in response to the image forming device judging that execution of the image formation process for the target data is possible;
execute the image formation process for the converted data in response to the image forming device judging that execution of the image formation process is not possible.

14. A method comprising:
obtaining, by an image forming device, at least one of target data and information specifying the target data from one of an internal memory and an external memory, wherein obtaining the at least one of the target data and the information specifying the target data is user-initiated at the image forming device;
determining, by the image forming device, whether execution of an image formation process for the target data by the image forming device is possible;
in response to determining that execution of the image formation process for the target data is not possible:
transmitting, by the image forming device, the obtained at least one of the target data and the information specifying the target data to an information processing device, wherein the image forming device is communicably connectable to the information processing device;
receiving, by the image forming device, converted data which is generated on the information processing device by converting the target data into the converted data having a data format which the image forming device is able to handle; and
executing, by the image forming device, an image formation process for the converted data.

15. A non-transitory computer readable medium having computer readable instructions stored thereon, which, when executed, cause an image forming device to:
obtain at least one of target data and information specifying the target data from one of an internal memory and an external memory, wherein obtaining the at least one of the target data and the information specifying the target data is user-initiated at the image forming device;
determine whether execution of an image formation process for the target data by the image forming device is possible;
in response to determining that execution of the image formation process for the target data is not possible:
transmit the obtained at least one of the target data and the information specifying the target data to the information processing device, wherein the image forming device is communicably connectable to the information processing device;
receive converted data generated on the information processing device by converting the target data into the converted data having a data format which the image forming device is able to handle; and
execute an image formation process for the converted data and in response to determining that execution of the image formation process for the target data is possible, execute the image formation process for the target data.

* * * * *